(12) United States Patent
Shimizu

(10) Patent No.: US 7,992,672 B2
(45) Date of Patent: Aug. 9, 2011

(54) ELECTRIC POWER STEERING SYSTEM

(75) Inventor: Yasuo Shimizu, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 696 days.

(21) Appl. No.: 11/987,535

(22) Filed: Nov. 30, 2007

(65) Prior Publication Data

US 2008/0164088 A1    Jul. 10, 2008

(30) Foreign Application Priority Data

Dec. 1, 2006  (JP) .................................. 2006-325628

(51) Int. Cl.
B62D 5/04    (2006.01)
(52) U.S. Cl. ........................................................ 180/446
(58) Field of Classification Search .................. 180/404, 180/446
See application file for complete search history.

(56) References Cited

U.S. PATENT DOCUMENTS

| | | | | |
|---|---|---|---|---|
| 4,727,950 A | * | 3/1988 | Shimizu et al. | 180/446 |
| 4,989,682 A | * | 2/1991 | Takahashi et al. | 180/446 |
| 6,018,691 A | * | 1/2000 | Yamamoto et al. | 701/41 |
| 6,112,845 A | * | 9/2000 | Oyama et al. | 180/443 |
| 6,520,279 B2 | * | 2/2003 | Fukumoto et al. | 180/446 |
| 6,796,400 B2 | * | 9/2004 | Ito et al. | 180/446 |
| 2003/0106737 A1 | * | 6/2003 | Itakura | 180/446 |
| 2004/0194559 A1 | * | 10/2004 | Nakamura et al. | 73/862.331 |
| 2005/0236223 A1 | * | 10/2005 | Yokota | 180/446 |

FOREIGN PATENT DOCUMENTS

| | | |
|---|---|---|
| JP | 58-15578 U | 7/1956 |
| JP | 11-078922 A | 3/1999 |
| JP | 2001-138940 A | 5/2001 |
| JP | 2002-234456 | 8/2002 |

* cited by examiner

*Primary Examiner* — Tony H. Winner
*Assistant Examiner* — Wesley Potter
(74) *Attorney, Agent, or Firm* — Arent Fox, LLP

(57) ABSTRACT

An electric power steering system includes a steering wheel, a rack-and-pinion type steering gear box connected to the steering wheel, a steering torque sensor, a pinion shaft, and a steering actuator mounted on the pinion shaft to assist a steering operation conducted by a driver. An overload preventing control is conducted so that a sum of a current conversion value of a steering torque detected by the steering torque sensor and an assist current calculated based on the steering torque becomes equal to a limit value. When the steering gear box has reached a stroke end, the assist current is prevented from excessively increasing, thereby preventing a reduction in durability of the steering gear box or a motor of the steering actuator.

12 Claims, 12 Drawing Sheets

LEFTWARD ROTATIONAL TORQUE

RIGHTWARD ROTATIONAL TORQUE

STROKE END

NON STROKE END

ELECTRIC POWER STEERING SYSTEM

CROSS-REFERENCE TO RELATED APPLICATION

The present invention claims priority under 35 USC 119 based on Japanese patent application No. 2006-325628, filed on Dec. 1, 2006. The entirety of the subject matter of this priority document is incorporated by reference herein.

BACKGROUND OF THE INVENTION

1. Field of the Invention

The present invention relates to an electric power steering system that prevents an assist current from excessively increasing and detrimentally affecting the durability of a gear box and/or the motor of a steering actuator.

2. Description of the Related Art

Japanese Patent Application Laid-open No. 2002-234456 (JP '456) discloses an electric power steering system having a steering device which includes a rack-and-pinion type steering gear box, wherein a steering torque is input from a steering actuator to the steering device to assist a steering operation conducted by a driver. In the steering device disclosed by JP '456, overheating of a motor of the steering actuator or a control system due to an overload is prevented by providing an upper limit value on an indicator current supplied to the motor of the steering actuator.

Limiting of the upper limit value of the indicator current supplied to the motor is initiated when a continuous service time of the motor exceeds a predetermined amount. The upper limit value is first gradually decreased from a predetermined maximum value to a minimum value at a predetermined gradually decreasing rate. The upper limit value of the supplied indicator current is then increased to the maximum value at a predetermined gradually increasing rate. The conditions for limiting the upper limit value of the supplied indicator current are less severe when a temperature sensor detects a decrease in the atmospheric temperature.

In the steering device disclosed by JP '456, when a rack bar of the steering gear box cannot be further moved after reaching a lateral stroke end, the steering torque detected by the steering torque sensor is steeply increased. Therefore, an assist current supplied to the motor of the steering actuator is also steeply increased. In order to accommodate such a steep increase in the assist current, the assist-current limiting technique disclosed by JP '456 is insufficient. Therefore, there is a need in the industry for a more reliable assist-current limiting technique.

SUMMARY OF THE INVENTION

The present invention has been achieved in view of the above circumstances and has an aspect to reliably prevent overloading either one of a steering gear box or a steering actuator of an electric power steering system.

In order to achieve the above aspect, according to a first feature of the present invention, there is provided an electric power steering system including: a steering wheel; a rack-and-pinion type steering gear box connected to the steering wheel; a steering torque sensor for detecting a steering torque input into the steering wheel; and a steering actuator driven by an assist current. The assist current is calculated based on the detected steering torque in order to assist a steering operation conducted by a driver. An overload preventing control for limiting the driving of the steering actuator is conducted so that a sum of the assist current and a current conversion value of the steering torque detected by the steering torque sensor becomes a predetermined threshold value.

Based on the structural arrangement of the first feature, when the steering operation conducted by the driver is assisted by the steering actuator of the electric power steering system, the overload preventing control is conducted so that the sum of the conversion current value of the steering torque detected by the steering torque sensor and the assist current calculated based on the steering torque becomes equal to the predetermined threshold value. Therefore, it is possible to suppress the assist current from excessively increasing when the steering gear box has reached the stroke end, thereby preventing the durability of the steering gear box or the steering actuator from being reduced.

According to a second feature of the present invention, in addition to the first feature, when the steering torque detected by the steering torque sensor is equal to or larger than a first threshold value, or when the assist current is equal to or larger than a second threshold value, the overload preventing control is conducted.

Based on the structural arrangement of the second feature, when the steering torque detected by the steering torque sensor is equal to or larger than the first threshold value, or when the assist current calculated based on the steering torque is equal to or larger than the second threshold value, the overload preventing control is conducted. Therefore, when an overload of the steering gear box or the steering actuator is liable to be generated in a transmitting system of steering torque, the overload preventing control is conducted.

According to a third feature of the present invention, in addition to the first feature, the system further includes a stroke end sensor for detecting a stroke end of the steering gear box. Therefore, when the stroke end is detected and the assist current is smaller than the threshold value, the overload preventing control is conducted using a threshold value that is less or lower than the predetermined threshold value.

Based on the structural arrangement of the third feature, when the stroke end sensor detects the stroke end of the steering gear box in a state in which the assist current is smaller than the predetermined threshold value, the overload preventing control is conducted using the lower threshold value. Therefore, even if the assist current is small due to a small friction coefficient of a road surface when the steering gear box reaches the stroke end, the overload preventing control is started. Further, the threshold value on the overload preventing control is decreased to further reliably prevent an overload of either one of the steering gear box or the steering actuator.

According to a fourth feature of the present invention, in addition to the first feature, the system further includes a stroke end sensor for detecting a stroke end of the steering gear box. Therefore, when the stroke end is detected and the steering torque is smaller than the predetermined threshold value, the overload preventing control is conducted using a threshold value that is less or lower than the predetermined threshold value.

Based on the structural arrangement of the fourth feature, when the stroke end sensor detects the stroke end of the steering gear box in a state in which the steering torque is smaller than the predetermined threshold value, the overload preventing control is conducted using the lower threshold value. Therefore, even if the steering torque is small due to a small friction coefficient of a road surface when the steering gear box reaches the stroke end, the overload preventing control is started. Further, the threshold value on the overload preventing control is decreased to further reliably prevent an overload of either one of the steering gear box or the steering actuator.

According to a fifth feature of the present invention, in addition to the third or fourth feature, the stroke end sensor detects the stroke end based on rigidity of the steering gear box.

Based on the structural arrangement of the fifth feature, the stroke end sensor detects the stroke end based on the rigidity of the steering gear box. Therefore, the stroke end is detected without needing a position sensor for detecting the position of a rack bar.

According to a sixth feature of the present invention, in addition to any of the first-to-fifth features, the steering torque sensor is a magnetostriction torque sensor.

Based on the structural arrangement of the fifth feature, the magnetostriction steering torque sensor is used as a steering torque sensor. Therefore, it is possible not only to increase the rigidity of the steering torque transmitting system but also to increase the upper limit value of the detectable steering torque as compared with a case using a steering torque sensor having a torsion bar.

The above and other aspects, features and advantages of the invention will become apparent from preferred embodiments taken in conjunction with the accompanying drawings.

DETAILED DESCRIPTION OF THE PREFERRED EMBODIMENTS

Figure 1:
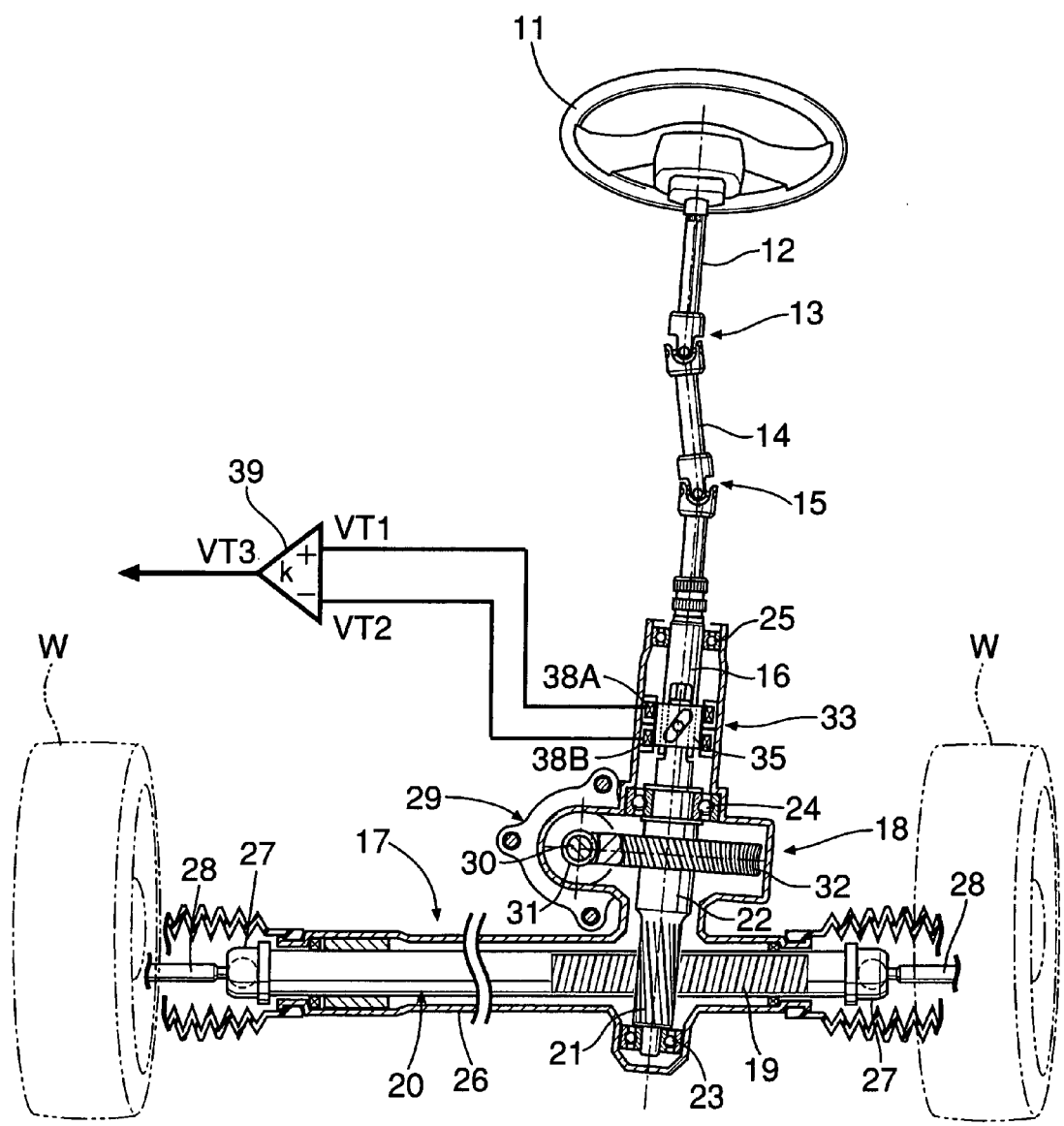
FIG. 1 is a schematic diagram of an electric power steering system according to one embodiment of the present invention.

Referring to FIG. 1, an electric power steering system in an automobile, according to an embodiment of the present invention, includes an upper steering shaft 12 integrally rotated with a steering wheel 11; an intermediate steering shaft 14 connected to the upper steering shaft 12 through an upper universal joint 13; a rack-and-pinion type steering gear box 17 connected to the intermediate steering shaft 14 through a lower universal joint 15 and a lower steering shaft 16; and a steering actuator 18 mounted in the steering gear box 17.

The steering gear box 17 includes a housing 26, a rack bar 20 having a rack 19 formed thereon; and a pinion shaft 22 having a pinion 21 operationally meshing with the rack 19. The housing 26 laterally and slidably supports the rack bar 20, supports the pinion shaft 22 at a location sandwiching the pinion 21 through a pair of ball bearings 23 and 24, and supports an upper portion of the lower steering shaft 16 through a ball bearing 25. Left and right opposite ends of the rack bar 20 are connected to left and right wheels W, W through left and right ball joints 27, 27 and left and right tie rods 28, 28.

The steering actuator 18 includes a brushless motor 29, a worm 31 provided on an output shaft 30 of the motor 29, and worm wheel 32 mounted on the pinion shaft 22 and meshed with the worm 31.

Figure 2:
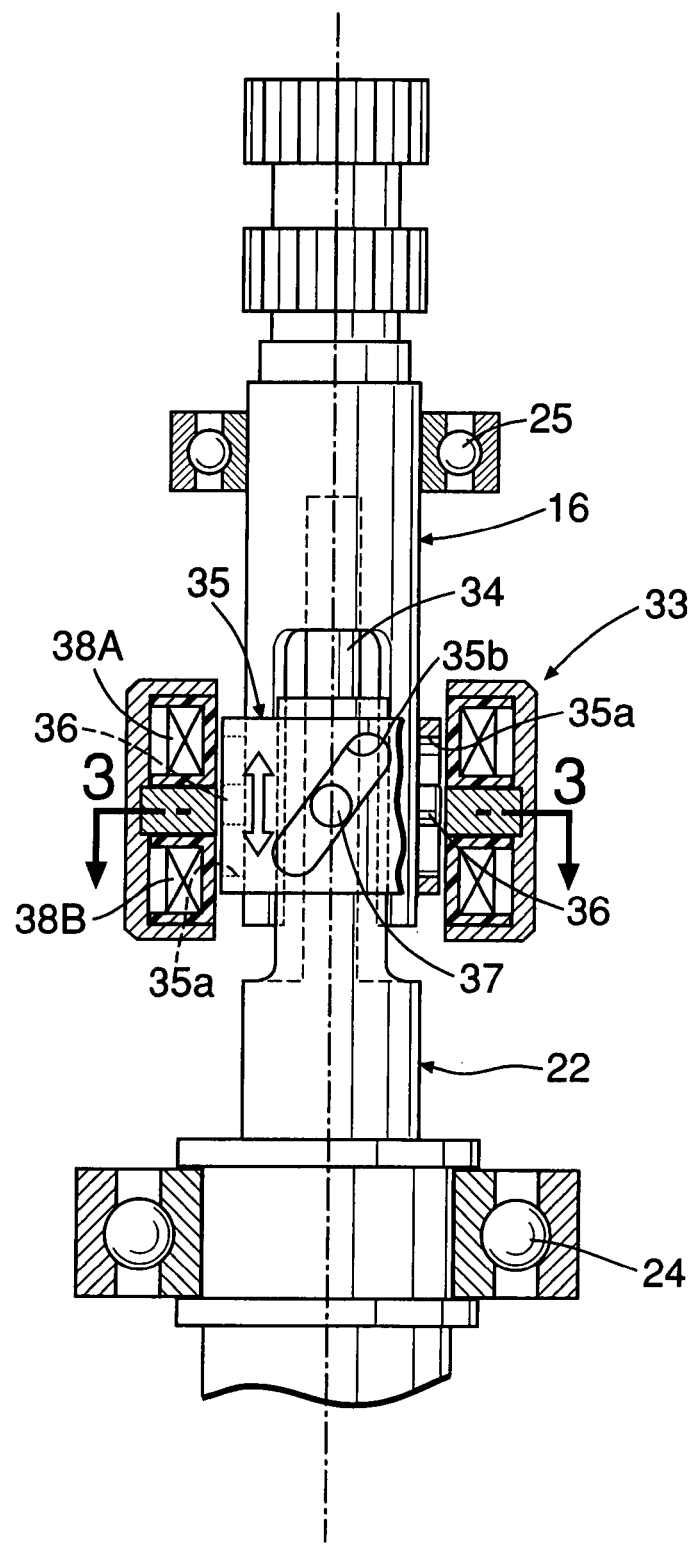
FIG. 2 is an enlarged view of a steering torque sensor.
Figure 3:
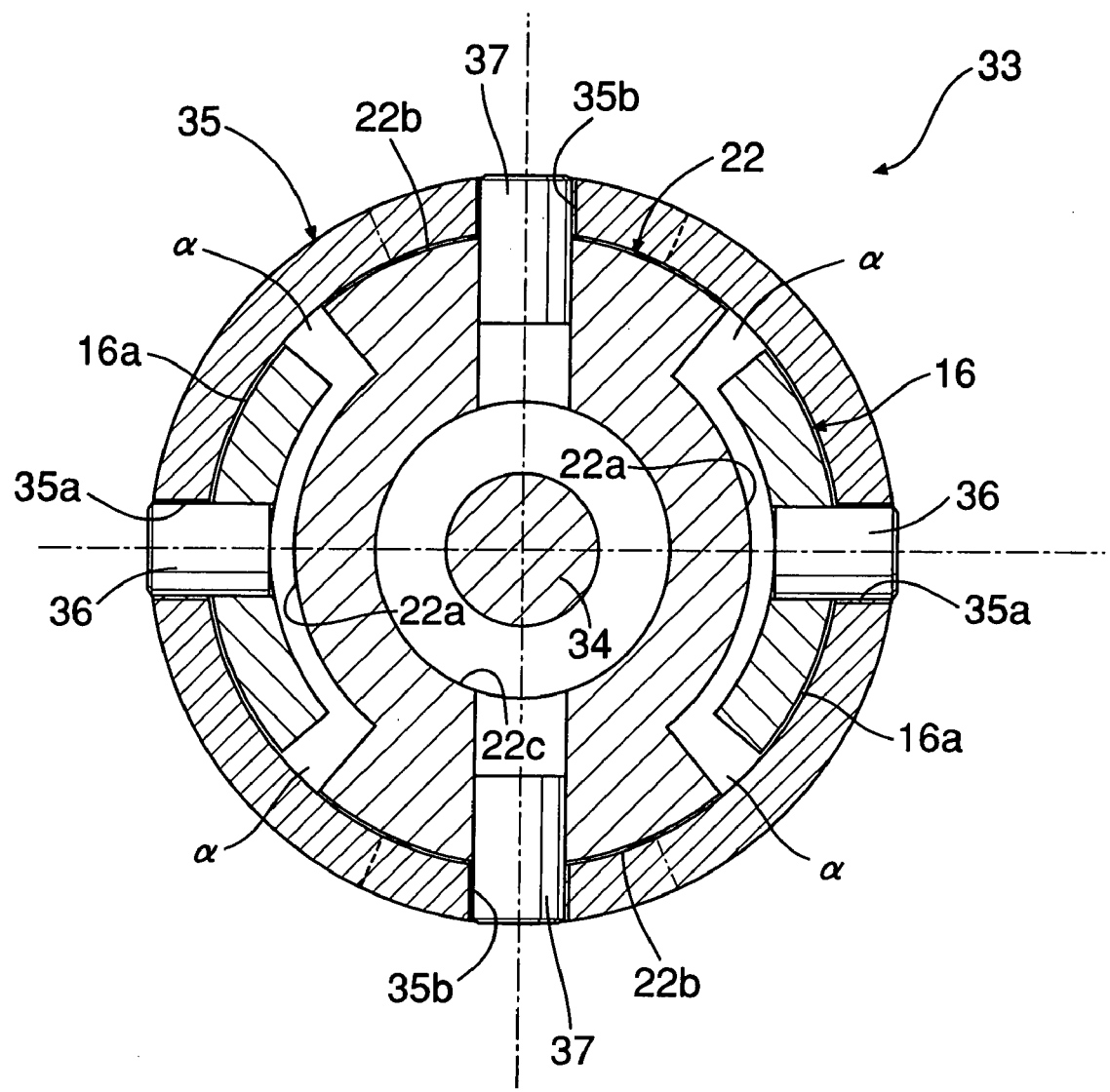
FIG. 3 is a cross-sectional view of the steering torque sensor taken along line 3-3 in FIG. 2.
Figure 4:
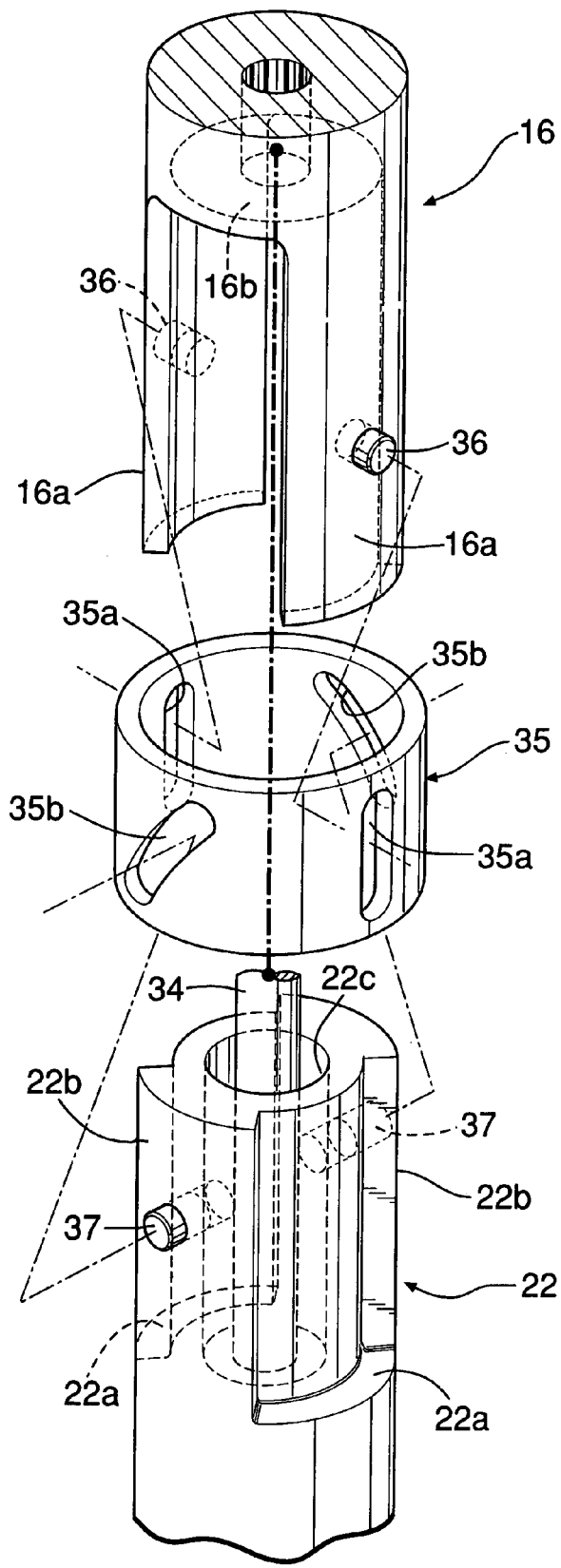
FIG. 4 is an exploded view of the steering torque sensor.

The structure of a torsion-bar type steering torque sensor 33 mounted between a lower end of the lower steering shaft 16 and an upper end of the pinion shaft 22 will be described below with reference to FIGS. 2 to 4.

The steering torque sensor 33 includes a pair of first guide portions 16a, 16a formed by bifurcating a lower end of the lower steering shaft 16; a pair of notches 22a, 22a formed by cutting off a portion of an upper end of the pinion shaft 22; and a pair of second guide portions 22b, 22b sandwiched between the notches 22a, 22a. The first guide portions 16a, 16a are fitted into the notches 22a, 22a, wherein the first guide portions 16a, 16a and the second guide portions 22b, 22b form a circular guide surface with four clearances a (see FIG. 3) provided therebetween. A bottom of a bore 22c formed at the center of the pinion shaft 22 and a ceiling surface 16b of the lower steering shaft 16 are connected to each other by a torsion bar 34.

A cylindrical collar 35 made of a magnetic material is movable in a vertical direction and is fitted on the above-described circular guide surface. The collar 35 is formed with a pair of first elongated bores 35a, 35a extending in an axial direction and a pair of second elongated bores 35b, 35b extending to be inclined with respect to the axial direction. A pair of guide pins 36, 36 embedded in the first guide portions 16a, 16a is inserted in the pair of first elongated bores 35a, 35a. A pair of second guide pins 37, 37 embedded in the second guide portions 22b, 22b is inserted in the pair of second elongated bores 35b, 35b.

A first coil 38A and a second coil 38B are vertically disposed to surround the collar 35 and are connected to a differential amplifying circuit 39 (see FIG. 1).

Figure 5A:
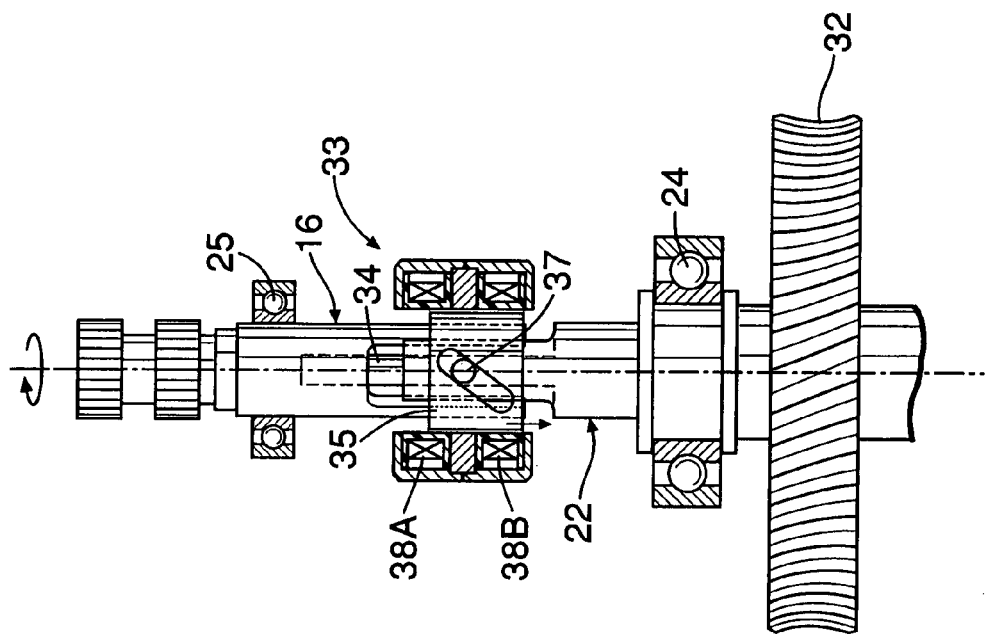
FIGS. 5A and 5B are diagrams explaining the operation of the steering torque sensor.
Figure 5B:
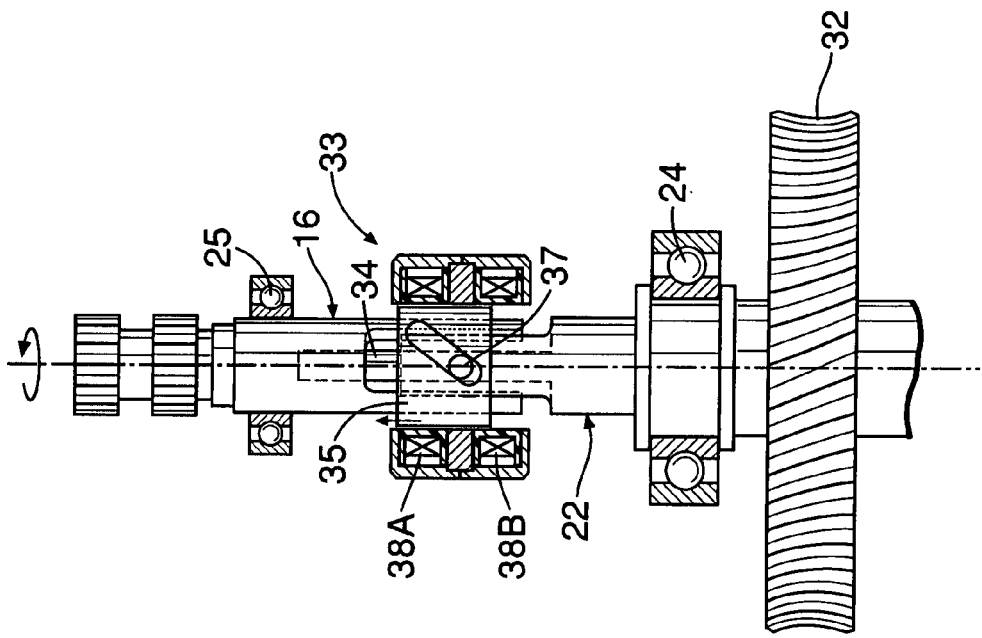

Thus, when a driver inputs a steering torque to the steering wheel 11, the steering torque is transmitted through the upper steering shaft 12, the upper universal joint 13, the intermediate steering shaft 14 and the lower universal joint 15 to the lower steering shaft 16, wherein the torsion bar 34 connecting the lower steering shaft 16 and the pinion shaft 22 to each other is torsionally deformed corresponding to the steering torque. When the lower steering shaft 16 is rotated relative to the pinion shaft 22 by the torsional deformation of the torsion bar 34, the collar 35 is rotated along with the lower steering shaft 16. Then, the collar 35 is rotated relative to the pinion shaft 22. Hence, the collar 35 is moved upward or downward depending on the direction of the relative rotation (see FIG. 5). At this time, the vertical movement of the collar 35 is permitted by the movement of the first elongated bores 35a, 35a about the first guide pins 36, 36.

Figure 6:
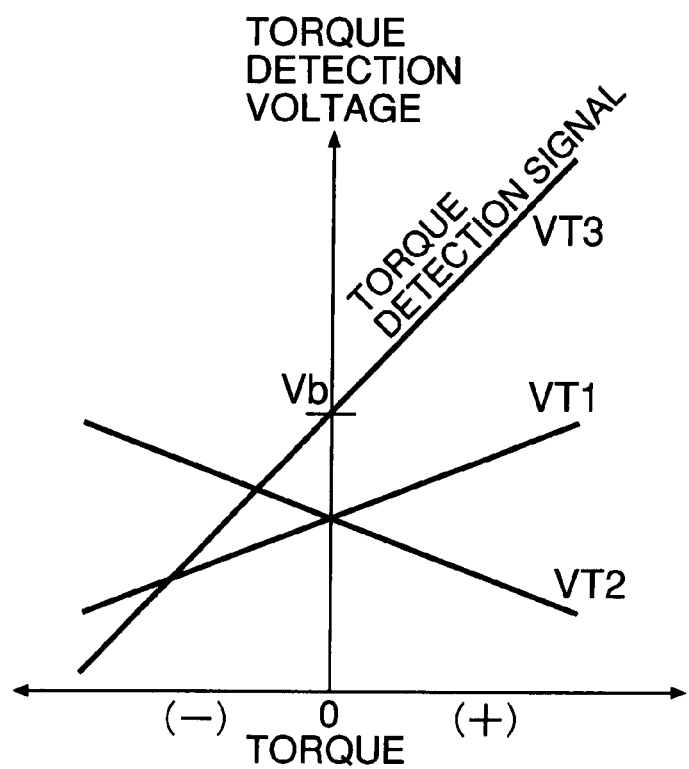
FIG. 6 is a graph showing characteristics in changing of a torque detection signal with respect to a steering torque.

As shown in FIG. 6, when the collar 35 is vertically moved corresponding to the steering torque, changes in magnetic characteristics of the first coil 38A and the second coil 38B are detected as changes in first and second output voltages VT1 and VT2. The differential amplifying circuit 39 multiplies a difference between the first and second output voltages VT1 and VT2 by a gain k to obtain a third output voltage VT3 (torque detection signal). The first output voltage VT1 increases with an increase in steering torque, and the second output voltage VT2 decreases with the increase in steering torque. Hence, the third output voltage VT3 increases with the increase in steering torque. When the steering torque is 0, the third output voltage VT3 is biased to become a predetermined bias voltage Vb (for example, 2.5 V).

$$VT3 = k \times (VT1 - VT2) + Vb$$

When the third output voltage VT3 is calculated in this manner, a predetermined steering torque T is located in a map stored in a computer (not shown) based on the third output voltage VT3 and a vehicle speed.

Figure 7:
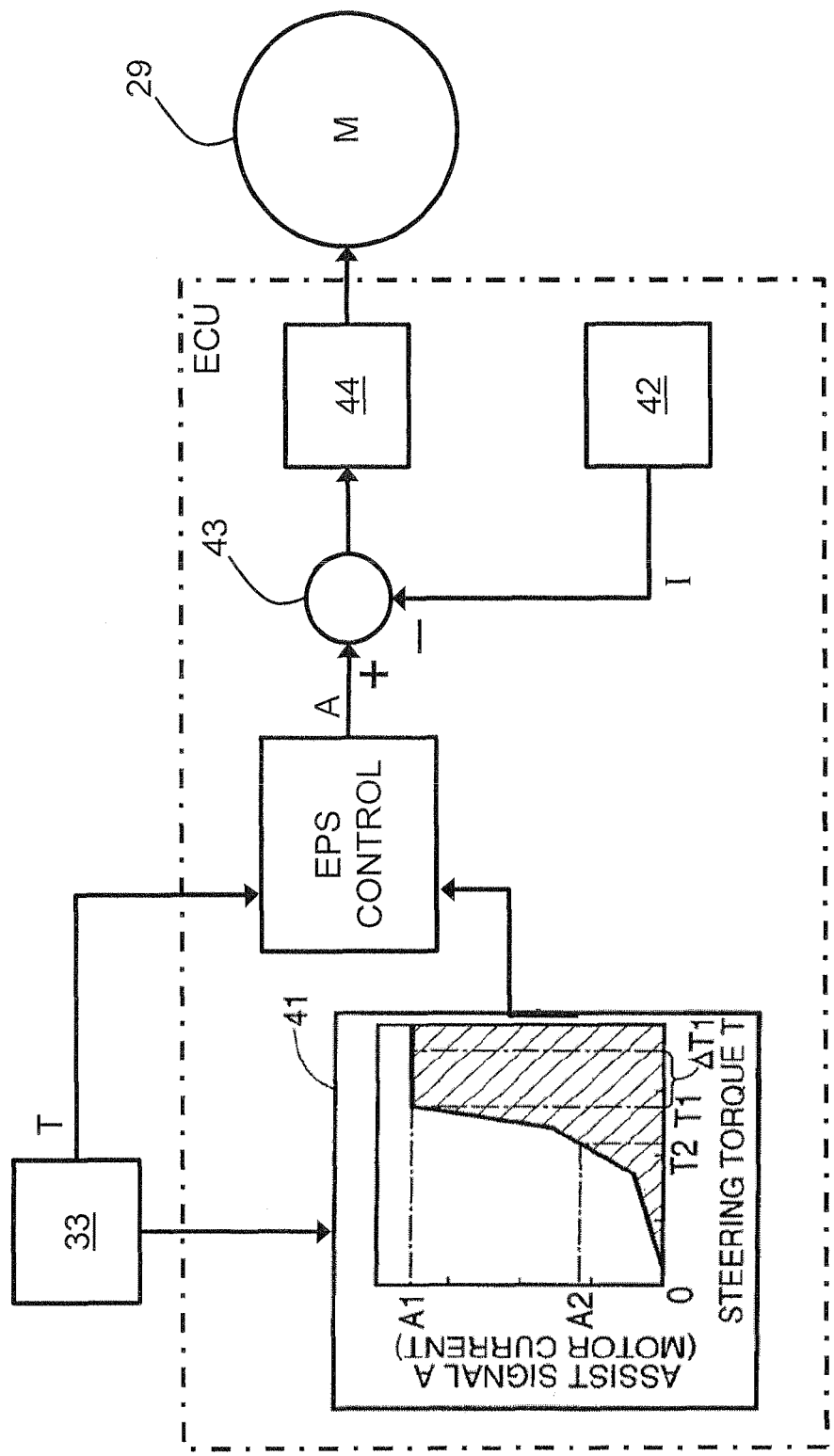
FIG. 7 is a block diagram of a control system of a steering actuator.
Figure 8:
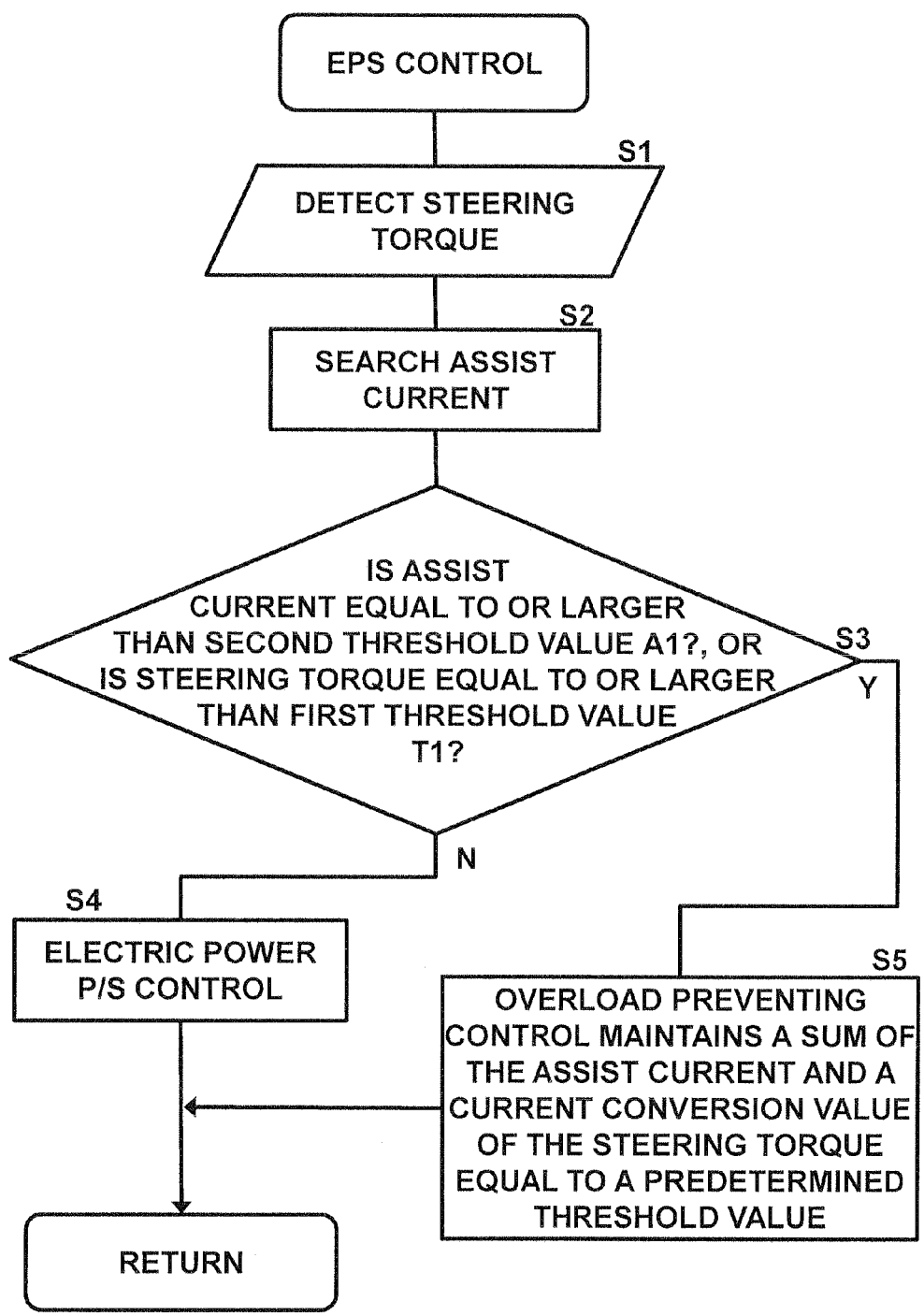
FIG. 8 is a flowchart explaining the control of a steering actuator.

As shown in FIGS. 7 and 8, at Step S1, a steering torque T is detected by the steering torque sensor 33. In Step S2, an assist current A to be supplied to the motor 29 of the steering actuator 18 is searched in an assist current map 41 based on the detected steering torque T. If the assist current A is determined to be smaller than a second threshold value A1 and the steering torque T is determined to be smaller than a first threshold value T1 in Step S3, the operation of the motor 29 is controlled based on the assist current A searched from the map in Step S4 (usual electric power steering control). If the assist current A is equal to or larger than the second threshold value A1 or if the steering torque T is equal to or larger than the first threshold value T1 in Step S3, the operation of the motor 29 is controlled at Step S5 based on a special overload-suppressing assist current A calculated from the assist current A searched from the map.

When the assist current A is calculated in Step S4 or Step S5, the motor 29 of the steering actuator 18 is subjected to a PID feedback control. Specifically, an actual current I in the motor 29 is detected by a current sensor 42; the actual current I is subtracted from the assist current A by a subtracting means 43 to provide a difference A−I; and a PID controller 44 controls the operation of the motor 29 based on the difference A−I so as to converge the difference of A−I to 0.

In Step S3 of the flowchart shown in FIG. 8, the situation where the assist current A is equal to or larger than the second threshold value A1 or where the steering torque T is equal to or larger than the first threshold value T1 is presumed, to be a situation where the rack bar 20 of the steering gear box 18 has been moved to a lateral limit position (stroke end) to reach a state in which the steering gear box 18 cannot be moved further. In this case, in trying to increase the turning angle, the driver tends to forcefully operate the steering wheel 11, and the steering torque T detected by the steering torque sensor 33 tends to increase. However, if the assist current A is increased based on an increase in the steering torque T, because the rack bar 20 is in the lateral limit position and the motor 29 cannot be rotated, there is a possibility that an excessive amount of current will flow through the motor 29 and cause overheating of the motor 29, or that an excessive power will be output from the motor 29, thereby affecting the durability of the steering box 17.

The following is the detailed description of an overload preventing control for the steering actuator 18 which is conducted when the assist current A is equal to or larger than the second threshold value A1 or when the steering torque T is equal to or larger than the first threshold value T1.

In the overload preventing control, the assist current A in the motor 29 of the steering actuator 18 is controlled so that equation (1) is established:

$$\Delta T^* + A = A1 \qquad (1)$$

wherein A1 is a second threshold value for the assist current A (see FIG. 7), and $\Delta T^*$ is a value of a current obtained by converting an excess of the detected torque T over the first threshold value T1 (see FIG. 7).

When equation (1) is modified with respect to the assist current A, equation (2) is obtained:

$$\begin{aligned} A &= A1 - \Delta T^* \\ &= A1 - (T^* - T1^*) \\ &= (A1 + T1^*) - T^* \\ &= (\text{limit value}) - T^* \end{aligned} \qquad (2)$$

wherein $T^*$ is a value of a current obtained by converting the steering torque T, and $T1^*$ is a value of a current obtained by converting the first threshold value T1 of the steering torque T.

Equation (2) produces a control that occurs where the sum of the assist current A and the conversion current value $T^*$ of the steering torque T is equal to a constant threshold value (=A1+T1*). In equation (2), when the conversion current value $T^*$ of the steering torque T is increased, the assist current A is decreased. Therefore, when the rack bar 20 has reached the lateral limit position, it is possible to prevent an excessive current from flowing through the motor 29 of the steering actuator 18 and prevent an excessive load from acting on meshed portions between the rack 19 and the pinion 21 of the steering box 17, thereby preventing the durability of the box 17 from being adversely affected.

For example, if A1=50 [A] (A1*=5,000 [kg·mm]) and T1=400 [kg·mm] (T1*=4 [A]), when the rack bar 20 has reached the lateral limit position and T=1,000 [kg·mm] (T*=10 [A]) is input thereinto, equation (3) is established based on equation (2):

$$\begin{aligned} A &= (A1 + T1^*) - T^* \\ &= (50 + 4) - 10 \\ &= 44\,[A] \end{aligned} \qquad (3)$$

Thus, it is possible to decrease the assist current by 6 [A] from 50 [A] to 44 [A] to decrease the assist torque by 600 [kg·mm].

As is apparent from equation (1), the overload preventing control maintains $\Delta T^* + A$ at the second threshold value A1 which is a fixed value. Therefore, even if the steering torque T is increased at the stroke end, the current supplied to the steering actuator 18 is decreased, thereby providing a good steering feeling to the driver.

In the above-described overload preventing control, a value associated with a steering torque is converted into a current value, but even if a value associated with the assist current is converted into a steering torque, the same effect is provided.

Specifically, the assist current A for the motor 29 of the steering actuator 18 is controlled so that equation (1') is established:

$$\Delta A^* + T = T1 \qquad (1')$$

wherein T1 is the first threshold value (see FIG. 7) for the steering torque, and ΔA* is a value of the torque obtained by converting an excess of the assist current A over the second threshold value T2 (see FIG. 7).

When the equation (1') is modified with respect to the steering torque T, equation (2') is obtained:

$$\begin{aligned} T &= T1 - \Delta A^* \\ &= T1 - (A^* - A1^*) \\ &= (T1 + A1^*) - A^* \\ &= (\text{limit value}) - A^* \end{aligned} \quad (2')$$

wherein A* is a value of the torque obtained by converting the assist current A, and A1* is a value of the torque obtained by converting the second threshold value A1 for the assist current A.

The equation (2') produces a control that occurs where the sum of the steering torque T and the conversion torque value A* of the assist current A is controlled so as to be equal to a constant limit value (=T1+A1*).

Figure 9:
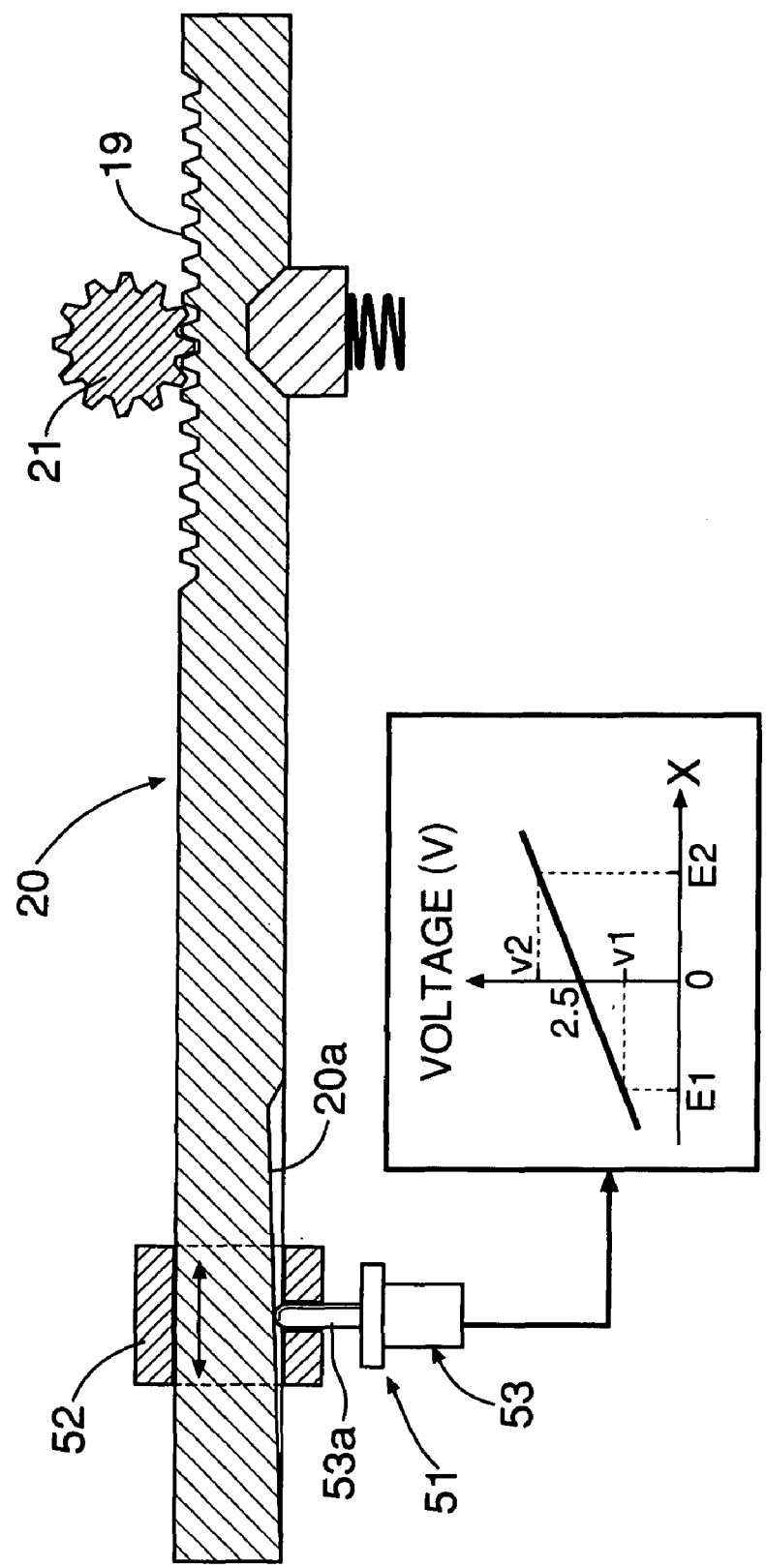
FIG. 9 is a schematic diagram used for explaining a stroke end sensor unit according to a second embodiment of the present invention.
Figure 10:
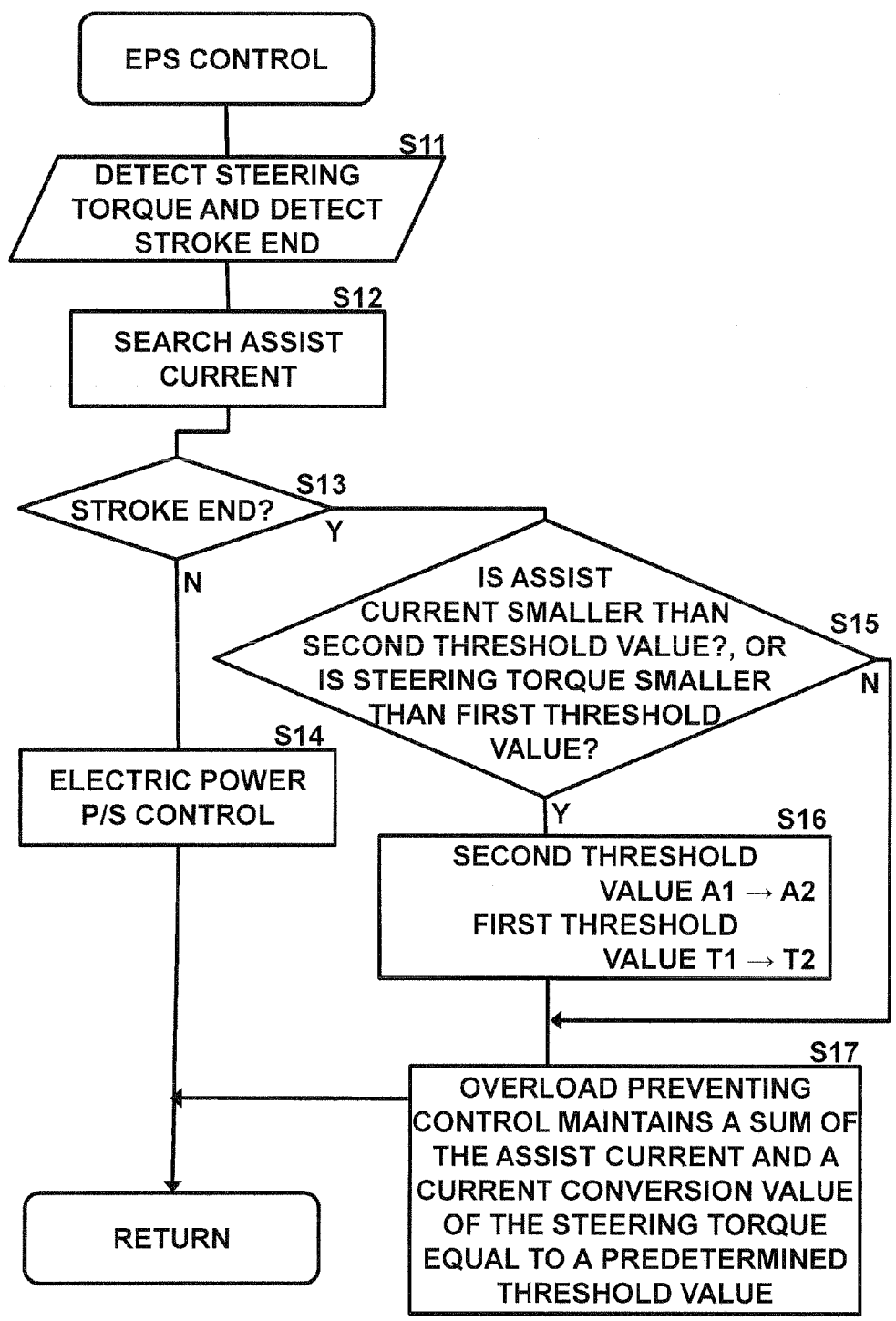
FIG. 10 is a flowchart explaining the control of a steering actuator.

FIGS. 9 and 10 show a second embodiment of the present invention.

In the first embodiment, when the assist current A is equal to or larger than the second threshold value A1 or the steering torque T is equal to or larger than the first threshold value T1, the overload suppressing control is conducted on the presumption that the steering gear box 17 has reached the stroke end. However, in the second embodiment, the stroke end is actually detected using a stroke end sensor unit 51.

As shown in FIG. 9, the stroke end sensor unit 51 includes a displacement sensor 53 having a detecting element 53a abutting an inclined cam face 20a formed in a portion of a rack bar 20 where the rack bar 20 is supported on a bearing 52. When the rack bar 20 is laterally moved, the detecting element 53a abutting the cam face 20a moves forward or rearward to change an output voltage v of the displacement sensor 53. When the output voltage v has become equal to or smaller than v1 or equal to or larger than v2, it is detected that the rack bar 20 has reached a left or right stroke end E1 or E2.

On a road surface having a small friction coefficient, such as an icy road or a snow-covered road, a steering reaction force input from the road surface to a tire is small. Hence, a steering torque detected by the steering torque sensor 33 is small compared with a road surface having an ordinary friction coefficient. Therefore, it is necessary to decrease the second threshold value A1 for the assist current A and the first threshold value T1 for the steering torque T in order to start the overload preventing control. Thus, in the second embodiment, when the stroke end of the steering gear box 17 is detected by the stroke end sensor unit 51 to start the overload preventing control, if the assist current A is smaller than the second threshold value A1 or if the steering torque T is smaller than the first threshold value T1, the threshold values A1 and T1 are decreased to threshold values A2 and T2, respectively (see FIG. 7).

As shown in FIG. 10, at Step S11, a steering torque T is detected by the steering torque sensor 33, and a stroke end is detected by the stroke end sensor unit 51. At Step S12, an assist current A to be supplied to the motor 29 of the steering actuator 18 is searched in an assist current map 41 by using the steering torque T. When the stroke end of the steering gear box 17 is not detected by the stroke end sensor unit 51 at Step S13, an electric power steering control is conducted at Step S14 similar to the control in the previously described first embodiment.

On the other hand, when the stroke end has been detected by the stroke end sensor unit 51 at Step S13, if the assist current A is not smaller than the second threshold value A1 and the steering torque T is not smaller than the first threshold value T1 at Step S15, the electric power steering control is conducted at Step S17 based on the second threshold value A1 and the first threshold value T1. If the assist current A is smaller than the second threshold value A1 or if the steering torque T is smaller than the first threshold value T1 at Step S15, the threshold values A1 and T1 are decreased to threshold values A2 and T2 (see FIG. 7) at Step S16 on the presumption that the road surface has a small friction coefficient, and the overload preventing control is conducted at Step S17 based on the decreased threshold values A2 and T2.

In this way, when the friction coefficient of the road surface is small, the second threshold value A1 for the assist current A and the first threshold value T1 for the steering torque T, which are used for the overload preventing control, are decreased to A2 and T2, respectively. Therefore, even if the assist current A or the steering torque T is small due to the small friction coefficient of the road surface when the rack bar reaches the stroke end, the overload preventing control is reliably started. Further, the threshold value for the overload preventing control is decreased to a value smaller than the usual value, thereby more reliably preventing an overload.

Figure 11B:
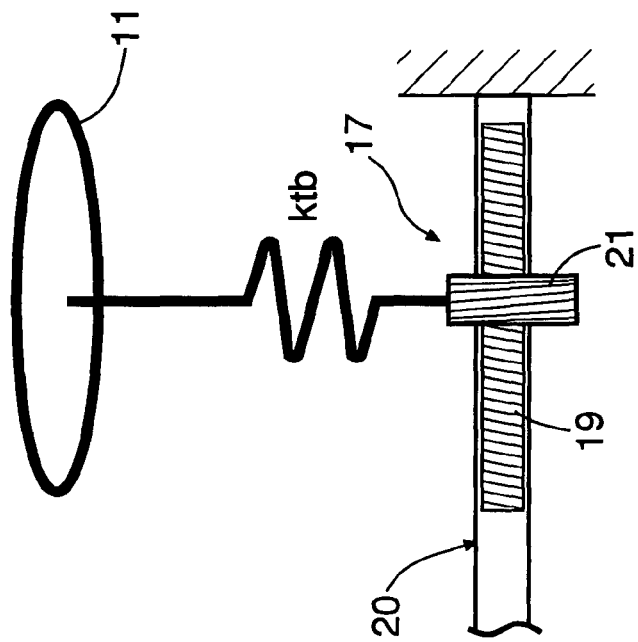
FIG. 11 is a schematic diagram used for explaining a stroke end sensor unit according to a third embodiment of the present invention.
Figure 11A:
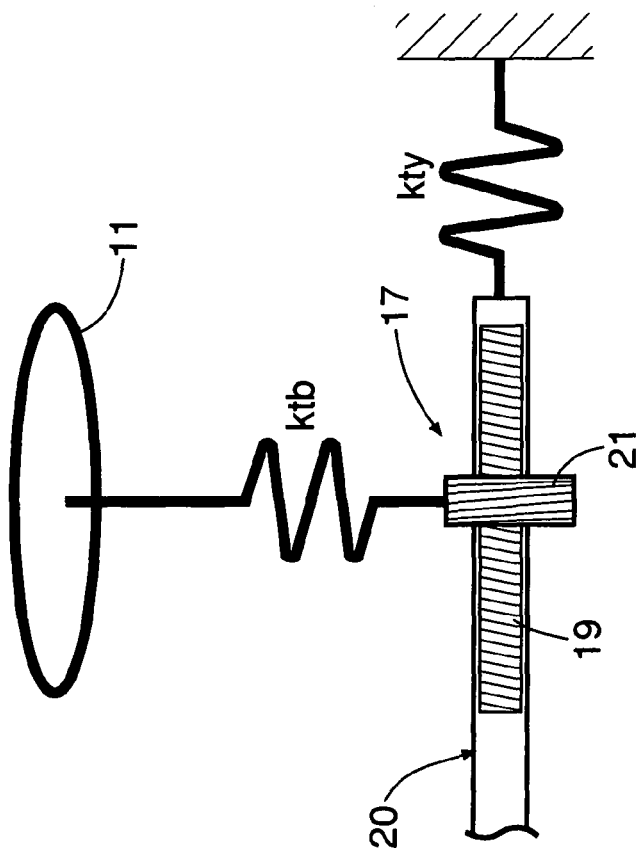

Next, a third embodiment of the present invention will be described with reference to FIG. 11.

The stroke end sensor unit 51 in the second embodiment mechanically detects the position of the rack bar 20, but a stroke end sensor unit 51 in the third embodiment detects a stroke end based on the rigidity of the steering gear box 17 relative to the transmission of the steering torque.

That is, a spring constant ktb of a torsion bar 34 of a steering torque sensor 33 and a spring constant kty of a tire are involved in a steering torque-transmitting system, and when the steering box 17 has reached a stroke end, the spring constant kty of the tire is not substantially involved. Therefore, even if the assist current to be supplied to the motor 29 of the steering actuator 18 is increased, the output shaft 30 of the motor 29 is difficult to rotate, wherein the stroke end is detected.

Specifically, a rotational angle θ of the motor 29 is detected by a resolver, and if a value obtained by dividing the steering torque T by the rotational angle θ is equal to or larger than a threshold value, it is determined that the rigidity of the steering gear box 17 is large, namely, the steering gear box 17 has reached the stroke end. If the motor 29 is a brushless motor, a rotation-controlling resolver mounted on the motor 29 is used. According to the third embodiment, the displacement sensor 53 in the second embodiment is not required, thereby reducing the overall cost of the invention.

Figure 12:
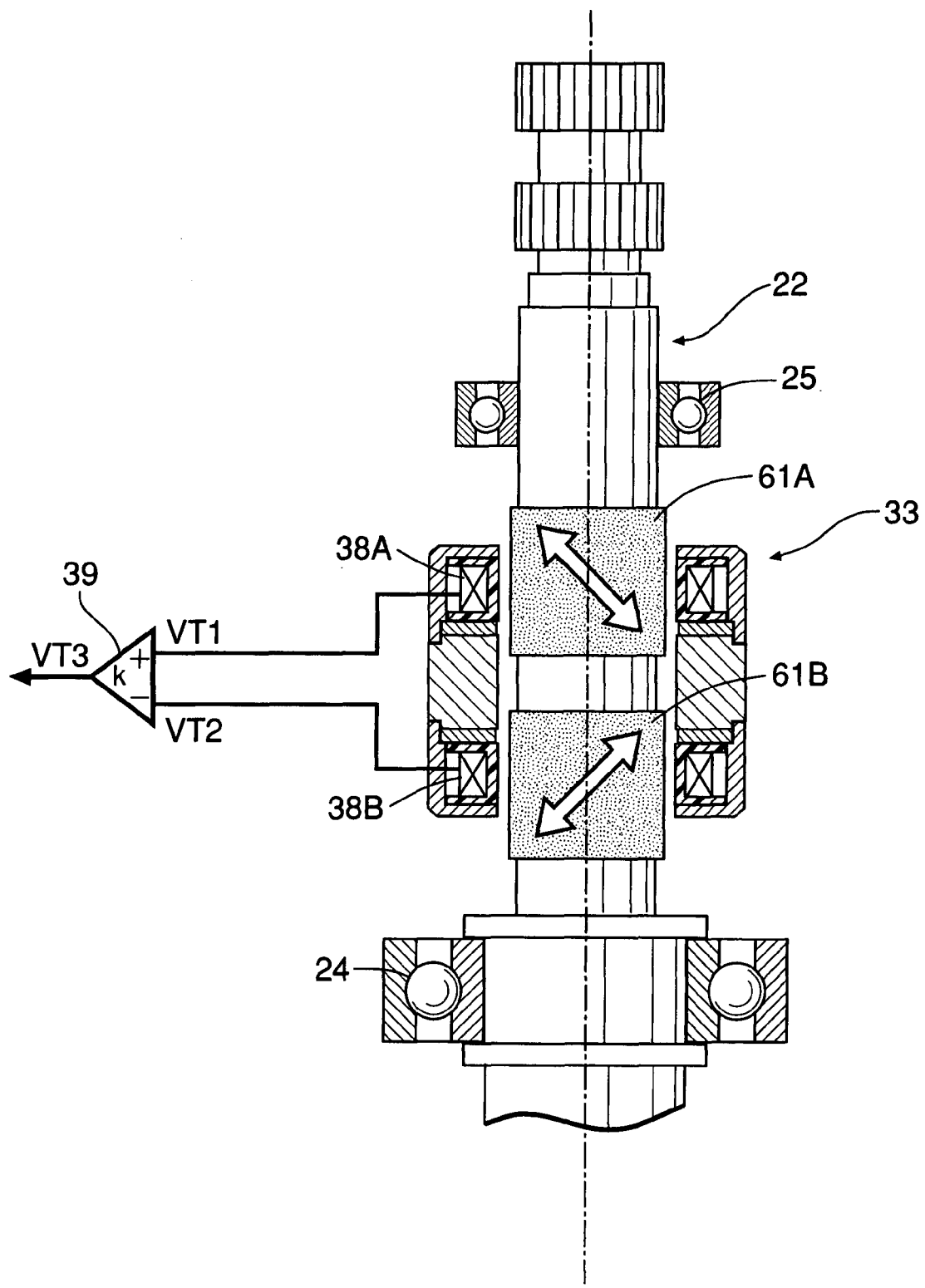
FIG. 12 is a schematic diagram used for explaining a magnetostriction steering torque sensor according to a fourth embodiment.

Next, a fourth embodiment of the present invention will be described with reference to FIG. 12.

The above-described steering torque sensor 33 uses the torsion bar 34, but the fourth embodiment uses a magnetostriction-type steering torque sensor 33.

The magnetostriction-type steering torque sensor 33 includes first and second magnetostriction membranes 61A and 61B, which are made, for example, of an Ni—Fe plating so as to cover a surface of a pinion shaft 22 over a predetermined width; a first coil 38A surrounding the first magnetostriction membrane 61A; and a second coil 38B surrounding the second magnetostriction membrane 61B. A differential amplifying circuit 39 is connected to the first coil 38A and the second coil 38B.

When a steering torque is input to the pinion shaft 22, an inductance of the first magnetostriction membrane 61A is changed from L to L+ΔL, an inductance of the second magnetostriction membrane 61B is changed from L to L−ΔL, and the amount of change ΔL is proportional to the applied steering torque. Therefore, ΔL is detected by using the first and second coils 38A and 38B.

As shown in FIG. 6, the differential amplifying circuit 39 multiplies a difference between first and second output voltages VT1 and VT2 by a gain k to obtain a third output voltage VT3 (torque detection signal). The first output voltage VT1 increases with an increase in steering torque; the second output voltage VT2 decreases with the increase in steering torque; and hence, the third output voltage VT3 increases with the increase in steering torque. When the steering torque is 0, the third output voltage VT3 is biased to become a predetermined bias voltage Vb (for example, 2.5 V).

$$VT3 = k \times (VT1 - VT2) + Vb$$

When the third output voltage VT3 is calculated in this manner, a predetermined steering torque T is obtained from a map stored in a computer (not shown) based on the third output voltage VT3 and a vehicle speed.

The magnetostriction steering torque sensor of this embodiment does not use the torsion bar 34, thereby increasing the rigidity of the steering torque transmitting system and also increasing the upper limit value on the detectable steering torque. Particularly, when the stroke end sensor unit 51 in the third embodiment is employed, the increased rigidity of the steering torque transmitting system improves the accuracy of detection of the stroke end.

The embodiments of the present invention have been described above, but various changes in design may be made without departing from the subject matter of the present invention.

For example, the steering actuator 18 is mounted on the pinion shaft 22 in the embodiments, but it may be mounted on the rack bar 20.

What is claimed is:

1. An electric power steering system comprising:
a steering wheel;
a rack-and-pinion steering gear box connected to the steering wheel;
a steering torque sensor for detecting a steering torque input to the steering wheel; and
a steering actuator driven by an assist current calculated based on the steering torque;
wherein an overload preventing control for limiting the driving of the steering actuator is conducted, the overload preventing control maintaining a sum of the assist current and a current conversion value of the steering torque detected by the steering torque sensor equal to a predetermined threshold value.

2. The electric power steering system according to claim 1, wherein, when the steering torque detected by the steering torque sensor is equal to or larger than a first threshold value or when the assist current is equal to or larger than a second threshold value, the overload preventing control is conducted, and wherein the first and second threshold values are different from the predetermined threshold value.

3. The electric power steering system according to claim 2, wherein the steering torque sensor is a magnetostriction torque sensor.

4. The electric power steering system according to claim 1, further including a stroke end sensor for detecting a stroke end of the steering gear box, wherein when the stroke end is detected and the assist current is smaller than the predetermined threshold value, the overload preventing control is conducted using a threshold value that is less than the predetermined threshold value.

5. The electric power steering system according to claim 4, wherein the stroke end sensor detects the stroke end based on rigidity of the steering gear box.

6. The electric power steering system according to claim 5, wherein the steering torque sensor is a magnetostriction torque sensor.

7. The electric power steering system according to claim 4, wherein the steering torque sensor is a magnetostriction torque sensor.

8. The electric power steering system according to claim 1, further including a stroke end sensor for detecting a stroke end of the steering gear box, wherein when the stroke end is detected and the steering torque is smaller than the predetermined threshold value, the overload preventing control is conducted using a threshold value that is less than the predetermined threshold value.

9. The electric power steering system according to claim 8, wherein the stroke end sensor detects the stroke end based on rigidity of the steering gear box.

10. The electric power steering system according to claim 9, wherein the steering torque sensor is a magnetostriction torque sensor.

11. The electric power steering system according to claim 8, wherein the steering torque sensor is a magnetostriction torque sensor.

12. The electric power steering system according to claim 1, wherein the steering torque sensor is a magnetostriction torque sensor.

* * * * *